(12) United States Patent
Osugi et al.

(10) Patent No.: US 12,387,051 B2
(45) Date of Patent: Aug. 12, 2025

(54) DIALOGUE PROCESSING APPARATUS, LEARNING APPARATUS, DIALOGUE PROCESSING METHOD, LEARNING METHOD AND PROGRAM

(71) Applicant: NIPPON TELEGRAPH AND TELEPHONE CORPORATION, Tokyo (JP)

(72) Inventors: Yasuhito Osugi, Tokyo (JP); Itsumi Saito, Tokyo (JP); Kyosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 475 days.

(21) Appl. No.: 17/784,004

(22) PCT Filed: Dec. 12, 2019

(86) PCT No.: PCT/JP2019/048632
§ 371 (c)(1),
(2) Date: Jun. 9, 2022

(87) PCT Pub. No.: WO2021/117180
PCT Pub. Date: Jun. 17, 2021

(65) Prior Publication Data
US 2023/0034414 A1     Feb. 2, 2023

(51) Int. Cl.
*G06F 40/35*     (2020.01)
*G06F 40/216*     (2020.01)
(Continued)

(52) U.S. Cl.
CPC ............ *G06F 40/35* (2020.01); *G06F 40/216* (2020.01); *G06F 40/284* (2020.01); *G06F 40/30* (2020.01);
(Continued)

(58) Field of Classification Search
None
See application file for complete search history.

(56) References Cited

U.S. PATENT DOCUMENTS 10,496,928 B2 *   12/2019   Oh ......................... G06N 5/041
10,503,828 B2 *   12/2019   Bae ........................ G06F 40/30
(Continued)

OTHER PUBLICATIONS

JPO Office action of JP2021563529. (Year: 2023).*
(Continued)

*Primary Examiner* — Richard Z Zhu (57) ABSTRACT

A dialogue processing apparatus includes one or more computers each including a memory and a processor configured to receive a question $Q_i$ as a word string representing a current question in an interactive machine reading comprehension task, a question history $\{Q_1, \ldots, Q_{i-1}\}$ as a set of word strings representing previous questions, and an answer history $\{A_1, \ldots, A_{i-1}\}$ as a set of word strings representing previous answers to the previous questions, and use a pre-learned first model parameter, to generate an encoded context vector reflecting an attribute or an importance degree of each of the previous questions and the previous answers; and receive a document P to be used to generate an answer $A_i$ to the question $Q_i$ and the encoded context vector, and use a pre-learned second model parameter, to perform matching between the document and the previous questions and previous answers, to generate the answer.

4 Claims, 7 Drawing Sheets

(51) Int. Cl.
  *G06F 40/284*   (2020.01)
  *G06F 40/30*    (2020.01)
  *G06F 16/3329*      (2025.01)
  *G06F 16/334*       (2025.01)
  *G06F 16/3349*      (2025.01)
  *G06F 40/289*       (2020.01)

(52) U.S. Cl.
  CPC ...... *G06F 16/3329* (2019.01); *G06F 16/3347* (2019.01); *G06F 16/3349* (2019.01); *G06F 40/289* (2020.01)

(56) References Cited

U.S. PATENT DOCUMENTS

| | | | | |
|---|---|---|---|---|
| 10,664,527 | B1* | 5/2020 | Henderson | G06F 16/3347 |
| 10,740,564 | B2* | 8/2020 | Shu | G06F 40/30 |
| 10,783,456 | B2* | 9/2020 | Strope | G06F 16/3329 |
| 10,915,538 | B2* | 2/2021 | Zhao | G06F 16/24575 |
| 11,200,506 | B2* | 12/2021 | Wu | G06F 40/30 |
| 11,256,658 | B2* | 2/2022 | Kruengkrai | G06N 3/045 |
| 11,487,953 | B2* | 11/2022 | Kim | H04L 51/02 |
| 11,593,672 | B2* | 2/2023 | Wu | G06N 3/044 |
| 11,687,734 | B2* | 6/2023 | Harper | G06F 40/295 704/9 |
| 11,861,307 | B2* | 1/2024 | Asao | G06F 40/58 |
| 11,972,365 | B2* | 4/2024 | Otsuka | G06N 3/047 |
| 12,026,472 | B2* | 7/2024 | Osugi | G06F 16/90 |
| 2020/0202226 | A1* | 6/2020 | Nagatani | G06N 3/044 |
| 2020/0285692 | A1* | 9/2020 | Ferrari | G06F 40/14 |
| 2020/0311207 | A1* | 10/2020 | Kim | G06F 40/131 |
| 2021/0192139 | A1* | 6/2021 | Joko | G06F 16/3347 |
| 2022/0043972 | A1* | 2/2022 | Nishida | G06F 40/20 |

OTHER PUBLICATIONS

PCT_JP2019_048632 search opinion. (Year: 2021).*
Huang et al. (2018) "FlowQA: Grasping flow in history for conversational machine comprehension", arXiv preprint arXiv: 1810.06683.

* cited by examiner

DIALOGUE PROCESSING APPARATUS, LEARNING APPARATUS, DIALOGUE PROCESSING METHOD, LEARNING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/048632, filed on 12 Dec. 2019, the disclosure of which is hereby incorporated herein by reference in its entirety.

TECHNICAL FIELD

The present invention relates to a dialogue processing apparatus, a learning apparatus, a dialogue processing method, a learning method, and a program.

BACKGROUND ART

Conventionally, studies related to machine reading comprehension have vigorously been conducted. The machine reading comprehension is a technology that receives a question and a document as inputs and generates, from the document, an answer to the question.

The conventional machine reading comprehension that has been vigorously studied conventionally uses a question-and-answer format. In other words, in the machine reading comprehension, even if a plurality of questions are input, these questions are treated as independent of each other, and an answer is independently generated in response to each of the questions. By contrast, in recent years, interactive machine reading comprehension in which questions and answers are alternately repeated has also been studied.

The interactive machine reading comprehension is a technology that receives a document, a current question, a question history, and an answer history as inputs, and generates an answer to the current question. Accordingly, the interactive machine reading comprehension allows an answer, considering details of a previously performed dialogue (i.e., the question history and the answer history), to be generated as questions and answers are repeated. For example, in NPL 1, as interactive machine reading comprehension that generates an answer to a current question, a technology that outputs a starting position and an ending position of a range in a document which serves as the answer is described. Note that the question history is a history of previous questions, while the answer history is a history of previous answers.

CITATION LIST

Non Patent Literature

[NPL 1] Hsin-Yuan Huang, Eunsol Choi, and Wen-tau Yih, "FlowQA: Grasping flow in history for conversational machine comprehension", arXiv preprint arXiv:1810.06683, 2018.

SUMMARY OF THE INVENTION

Technical Problem

Meanwhile, in the interactive machine reading comprehension, the entire question history and the entire answer history are not necessarily important to the current question. However, for example, the technology described in NPL 1 gives consideration to a history of several immediately previous questions and a history of several immediately previous answers, and it is impossible to selectively choose histories of questions and answers that are required for an answer to the current question.

For example, when a pair of one question and one answer to the question is referred to as one turn, a topic may change in a dialogue such that a topic A is discussed in first and second turns, a topic B is discussed in third and fourth turns, and the topic A is discussed in a fifth turn. At this time, the technology described in NPL 1 gives consideration to a question history and an answer history in the immediately previous N turns.

Accordingly, when, e.g., N is 2 and the current question is related to the topic A, consideration is given to questions and answers in a dialogue related to the topic A in the fifth turn and to questions and answers in a dialogue related to the topic B in the fourth turn as histories, but questions and answers in a dialogue related to the topic A in the first and second turns cannot be used as a history. Meanwhile, when, e.g., N is 5 and the current question is related to the topic A, consideration is given to questions and answers in dialogues in the first to fifth turns, but consideration is given also to questions and answers during a dialogue about the topic B remotely related to the topic A of the current question as a history.

An aspect of the present invention has been achieved in view of the points described above, and an object thereof is to generate an answer considering a history required for an answer to a current question.

Means for Solving the Problem

To attain the object described above, a dialogue processing apparatus according to an aspect of an embodiment includes: a context encoding means that receives, as inputs, a question $Q_i$ as a word string representing a current question in an interactive machine reading comprehension task, a question history $\{Q_1, \ldots, Q_{i-1}\}$ as a set of word strings representing previous questions in the interactive machine reading comprehension task, and an answer history $\{A_1, \ldots, A_{i-1}\}$ as a set of word strings representing previous answers to the previous questions in the interactive machine reading comprehension task, and uses a pre-learned first model parameter, to generate an encoded context vector u reflecting at least one of an attribute and an importance degree of each of the previous questions and the previous answers; and an answer generation means that receives, as inputs, a document P to be used to generate an answer $A_i$ to the question $Q_i$ and the encoded context vector u, and uses a pre-learned second model parameter, to perform matching between the document P and the previous questions and previous answers, to generate the answer $A_i$ to the question $Q_i$.

Effects of the Invention

It is possible to generate the answer considering the history required for the answer to the current question.

DESCRIPTION OF EMBODIMENTS

A description will be given below of an embodiment of the present invention. In the present embodiment, a description will be given of a dialogue processing apparatus 10 capable of generating an answer considering histories (a question history and an answer history) required for an answer to a current question in interactive machine reading comprehension. Note that previously asked questions in the question history and previously given answers in the answer history are hereinafter referred to also as "previous questions" and "previous answers".

In the interactive machine reading comprehension, an answer to the current question is generated herein using a model implemented by a neural network. Accordingly, the dialogue processing apparatus 10 according to the present embodiment has a "learning period" during which parameters of this model (hereinafter referred to also as "model parameters") are learned and a "deduction period" during which the answer to the current question is generated using the learned model parameters.

During the learning period in the present embodiment, the model parameters are learned using both of an interactive machine reading comprehension task of answering the current question while using the histories (the question history and the answer history), and a class categorization task of categorizing each of sentences in a given document based on an attribute and an importance degree of the sentence. In other words, the model parameters are learned through multi-task learning of the interactive machine reading comprehension task and the class categorization task. This allows a trained model to acquire an ability to generate the answer to the current question while referring to the histories, and an ability to categorize each of the sentences in the given document based on the attribute and importance degree of the sentence. That is, it becomes possible for the trained model to determine effectiveness of each of the previous questions and each of the previous answers for the answer to the current question, and answer the current question based on the effectiveness.

It is assumed hereinbelow that the model parameters have already been learned through the multi-task learning of the interactive machine reading comprehension task and the class categorization task, and a description will be given in a first embodiment of the deduction period during which the answer to the current question is generated using the learned model parameters, while a description will be given in a second embodiment of the learning period during which the model parameters are learned through the multi-task learning of the interactive machine reading comprehension task and the class categorization task.

First Embodiment

In the first embodiment, a description will be given of the dialogue processing apparatus 10 that generates the answer to the current question on the assumption that the model parameters have already been learned.

<Overall Configuration>

Figure 1:
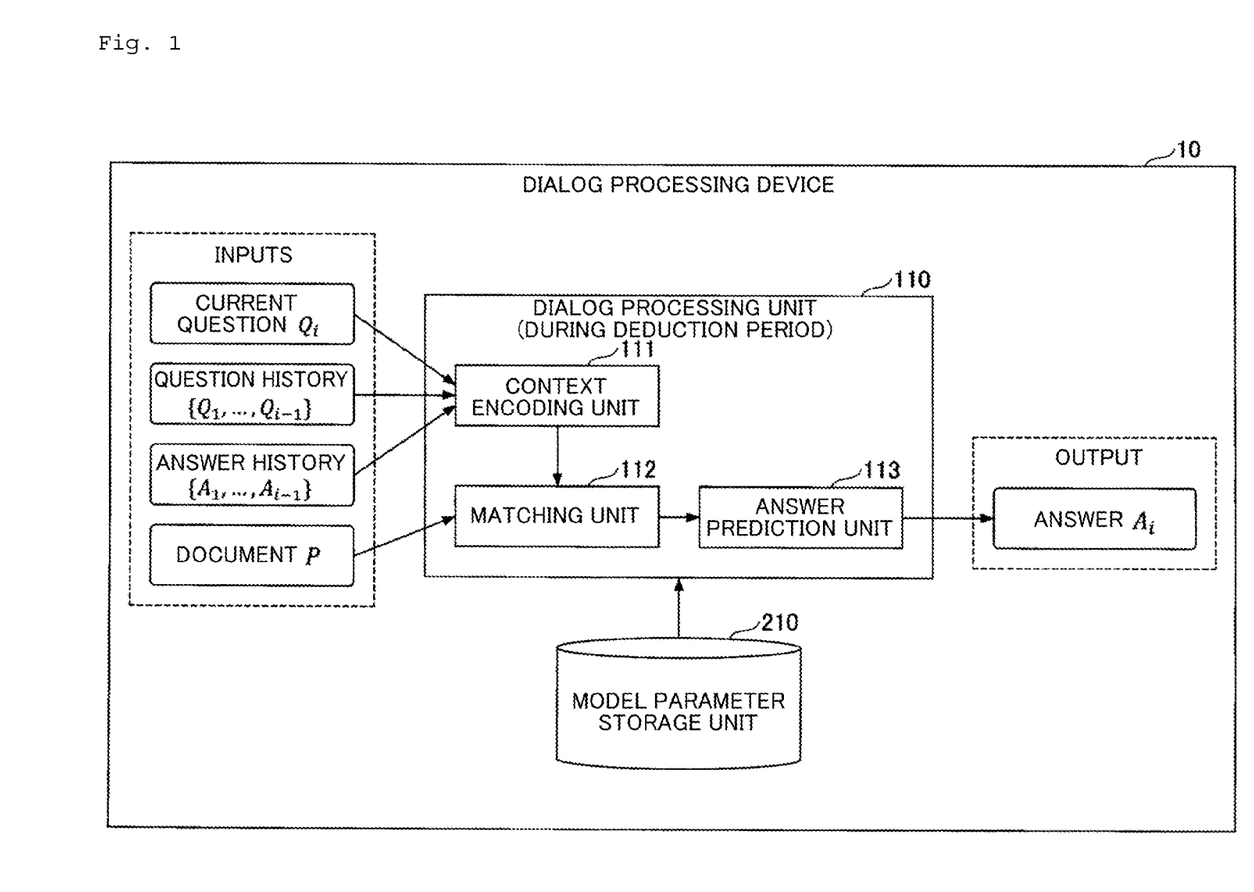
FIG. 1 is a diagram illustrating an example of an overall configuration of a dialogue processing apparatus in a first embodiment.

First, referring to FIG. 1, a description will be given of an overall configuration of the dialogue processing apparatus 10 in the first embodiment. FIG. 1 is a diagram illustrating an example of the overall configuration of the dialogue processing apparatus 10 in the first embodiment.

As illustrated in FIG. 1, the dialogue processing apparatus 10 in the first embodiment has a dialogue processing unit 110 and a model parameter storage unit 210.

The dialogue processing unit 110 receives, as inputs, a current question $Q_i$, a question history $\{Q_1, \ldots, Q_{i-1}\}$, an answer history $\{A_1, \ldots, A_{i-1}\}$, and a document P, and uses the learned model parameters stored in the model parameter storage unit 210, to generate and output an answer $A_i$ to the current question $Q_i$. Here, i represents a turn. As described above, the turn refers to a pair of one question and one answer to the question (i.e., one dialogue conversation). The document may also be referred to as, e.g., a "passage", or a "search target text".

Note that each of the current question $Q_i$, the previous questions $Q_1, \ldots, Q_{i-1}$ in the question history $\{Q_1, \ldots, Q_{i-1}\}$, the previous answers $A_1, \ldots, A_{i-1}$ in the answer history $\{A_1, \ldots, A_{i-1}\}$, and the document P is expressed by a word string.

The dialogue processing unit 110 includes a context encoding unit 111, a matching unit 112, and an answer prediction unit 113. Each of the units is implemented by a neural network. Among the model parameters, model parameters to be used by the context encoding unit 111 (i.e., parameters of the neural network implementing the context encoding unit 111) will be hereinafter referred to as "first model parameters". Likewise, among the model parameters, model parameters to be used by the matching unit 112 and the model parameters to be used by the answer prediction unit 113 will be referred to as "second model parameters" and "third model parameters", respectively.

The context encoding unit 111 receives, as inputs, the current question Q, the question history $\{Q_1, \ldots, Q_{i-1}\}$, and the answer history $\{A_1, \ldots, A_{i-1}\}$, and uses the learned first model parameters, to perform encoding of a context reflecting the attribute and importance degree of each of the previous questions and the previous answers in the question history and the answer history, to generate and output an encoded context vector u. To obtain the encoded context vector u mentioned above, it is necessary to discriminate the current question, the previous questions in the question history, and the previous answers in the answer history from each other and consider the respective attributes and importance degrees thereof.

The discrimination of the current question, the previous questions in the question history, and the previous answers in the answer history can be performed by, e.g., regarding each of the current question, the previous questions, and the previous answers as a single sentence and interposing special characters among the individual sentences. Meanwhile, the consideration of the attributes and importance degrees of the individual sentences can be performed through the learning of the class categorization task of categorizing each of sentences in a given document based on an attribute and importance degree of the sentence. Note that a sentence is expressed by a string of one or more words (word string).

The encoded context vector u generated and output by the context encoding unit 111 is given by the following expression.

$$u \in \mathbb{R}^{d_1 \times L_1} \quad [\text{Math. 1}]$$

where $d_1$ represents a number of dimensions of a feature value, and $L_1$ represents a number of words obtained by adding up a total number of words in $Q_i$, $\{Q_1, \ldots, Q_{i-1}\}$, and $\{A_1, \ldots, A_{i-1}\}$ and a number of words of special characters representing a beginning of a sentence, an end of the sentence, a separation of the sentence, and the like.

As the neural network implementing the context encoding unit 111, e.g., a model referred to as BERT (Bidirectional Encoder Representations from Transformers) described in Reference Literature 1 listed below can be used. In this case, a word string, obtained by adding a class token [CLS] to the beginning thereof and obtained by connecting individual sentences with separator tokens [SEP] to discriminate $Q_i$, $Q_1, \ldots, Q_{i-1}$, and $A_1, \ldots, A_{i-1}$ from each other, is input to the BERT, and an encoded context vector u is obtained as an output therefrom. At this time, when a number of words in the word string input to the BERT is less than a given number of words, a required number of padding tokens [PAD] are added to the end thereof.

Reference Literature 1: J. Devlin, M.-W. Chang, K. Lee, and K. Toutanova, "Bert: Pre-training of deep bidirectional transformers for language understanding", arXiv preprint arXiv: 1810.04805, 2018.

The matching unit 112 generates and outputs, for each of the words in the document P, a feature value considering information on the current question $Q_i$ and the histories (the question history $\{Q_1, \ldots, Q_{i-1}\}$ and the answer history $\{A_1, \ldots, A_{i-1}\}$). In other words, the matching unit 112 receives, as inputs, the document P and the encoded context vector u, and uses the learned second model parameters, to generate and output the feature value considering the information on the current question $Q_i$ and the histories, which is given by the following expression.

$$v \in \mathbb{R}^{d_2 \times L_2} \quad [\text{Math. 2}]$$

where $d_2$ represents a number of dimensions of the feature value and $L_2$ represents a number of words obtained by adding up the number of words in the document P and a number of words of special characters.

The neural network implementing the matching unit 112 is required to perform word-by-word matching between the document P and the current question $Q_i$, the question history $\{Q_1, \ldots, Q_{i-1}\}$, and the answer history $\{A_1, \ldots, A_{i-1}\}$. There are a plurality of network models that are considered to satisfy the requirement. For example, it is possible to use a model including a character embed layer, a word embed layer, a contextual embed layer, and an attention layer which are included in a bidirectional attention flow model described in Reference Literature 2 listed below. In this case, the document P is input to the character embed layer and to the word embed layer, through the contextual embed layer, and to the attention layer. The encoded context vector u is also input to the attention layer. Then, an output from the attention layer may be used appropriately as a feature value v.

Reference Literature 2: Min Joon Seo, Aniruddha Kembhavi, Ali Farhadi, and Hannaneh Hajishirzi, "Bidirectional attention flow for machine comprehension", In ICLR 2017.

Note that the BERT described in Reference Literature 1 mentioned above satisfies requirements of both the context encoding unit 111 and the matching unit 112, and therefore it is also possible to use the BERT alone to implement the context encoding unit 111 and the matching unit 112. In this case, a word string obtained by connecting $Q_i$, $Q_1, \ldots, Q_{i-1}$, $A_1, \ldots, A_{i-1}$, and P with the separator tokens [SEP] is input to the BERT. At this time, segment embedding is used to discriminate respective rolls of the context encoding unit 111 and the matching unit 112 from each other. In other words, by making the segment embedding for $Q_i$, $Q_1, \ldots, Q_{i-1}$, $A_1, \ldots, A_{i-1}$ different from the segment embedding for P, the respective rolls of the context encoding unit 111 and the matching unit 112 are discriminated from each other. As the feature value v, a feature value corresponding to the document P among outputs from the BERT may be used appropriately.

The answer prediction unit 113 receives, as an input, the feature value v of the document P that has been subjected to word-by-word matching with the current question $Q_i$, the question history, and the answer history, and uses the learned third model parameters, to generate and output the answer $A_i$ to the current question $Q_i$. The answer $A_i$ is represented herein by a word string, and there are two types of generation methods therefor.

The first generation method is in an extraction format in which a word string in the document P is extracted therefrom and given as an answer, while the second method is in a generation format in which not only words in the document P, but also words in a given vocabulary set determined in advance are used to generate an answer. In the extraction format, it is required to predict each of a probability that each of the words in the document P is at a starting position of an answer range and a probability that each of the words in the document P is at an ending position of the answer range, derive the answer range by dynamic programming based on results of the prediction, and give a word string in the answer range as the answer $A_i$. Meanwhile, in the generation format, it is required to generate the answer $A_i$ for each of the words.

Examples of a neural network that can be used in the extraction format include a model including a modeling layer and an output layer which are described in Reference Literature 2 mentioned above. In this case, the feature value v is input to the modeling layer and to the output layer, and the probability that each of the words in the document P is at the starting position and the probability that each of the words in the document P is at the ending position are output.

Meanwhile, examples of a neural network that can be used in the generation format include a pointer-generator model described in Reference Literature 3 shown below. In this case, the feature value v is input to an encoder of the pointer-generator model, and a probability indicating an importance degree of each of the words in the document P is output. This probability and a probability indicating an importance degree of a given external vocabulary set determined in advance are input to a decoder of the pointer-generator model, and the answer $A_i$ is generated.

Reference Literature 3: Abigail See, Peter J. Liu, and Christopher D. Manning, "Get to the point: Summarization with pointer-generator networks", In Proceedings of the 55th Annual Meeting of the Association for Computational Linguistics (Volume 1: Long Papers), pp. 1073-1083, July 2017.

Note that the matching unit 112 and the answer prediction unit 113 need not be separated from each other as two functional units. For example, the matching unit 112 and the answer prediction unit 113 may also be included in one functional unit.

The model parameter storage unit 210 stores the learned model parameters (i.e., the learned first model parameters, the learned second model parameters, and the learned third model parameters).

<Dialogue Processing>

Figure 2:
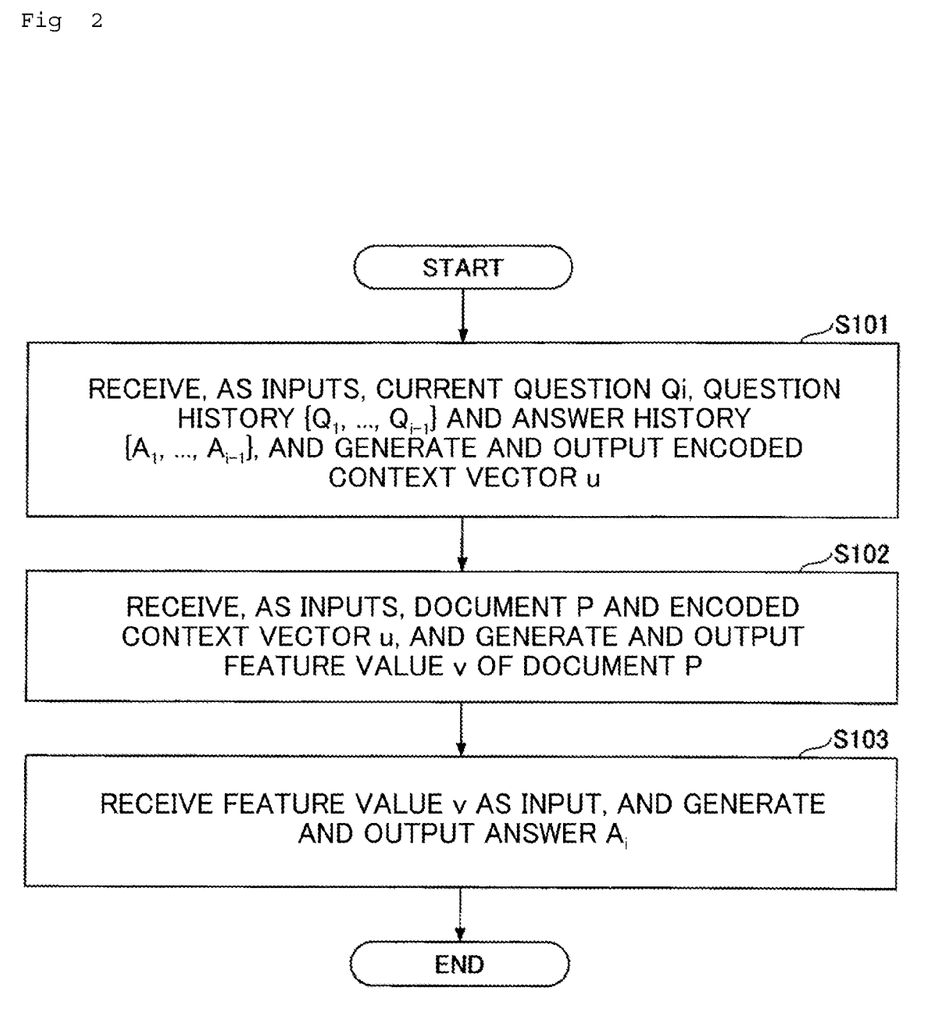
FIG. 2 is a flow chart illustrating an example of dialogue processing in the first embodiment.

Referring to FIG. 2, a description will be given below of processing (dialogue processing) of receiving, as inputs, the current question $Q_i$, the question history $\{Q_1, \ldots, Q_{i-1}\}$, and the answer history $\{A_1, \ldots, A_{i-1}\}$, and uses the learned model parameters to generate and output the answer $A_i$ to the current answer $Q_i$. FIG. 2 is a flow chart illustrating an example of the dialogue processing in the first embodiment.

First, the context encoding unit 111 of the dialogue processing unit 110 receives, as inputs, the current question $Q_i$, the question history $\{Q_1, \ldots, Q_{i-1}\}$, and the answer history $\{A_1, \ldots, A_{i-1}\}$, and uses the learned first model parameters, to generate and output the encoded context vector u (Step S101).

Next, the matching unit 112 of the dialogue processing unit 110 receives, as inputs, the document P and the encoded context vector u output in Step S101 described above, and uses the learned second model parameters, to generate and output the feature value v (Step S102).

Then, the answer prediction unit 113 of the dialogue processing unit 110 receives, as an input, the feature value v output in Step S102 described above, and uses the learned third model parameters, to generate and output the answer $A_i$ (Step S103). Thus, it is possible to generate and output, as the answer to the current question $Q_i$, the answer $A_i$ considering the attribute and importance degree of each of the previous questions and the previous answers in the histories (i.e., the answer $A_i$ intensively considering the previous questions and the previous answers each related to the current question $Q_i$).

Second Embodiment

In the second embodiment, a description will be given of the dialogue processing apparatus 10 that learns the model parameters on the assumption that these model parameters have not been learned yet.

<Overall Configuration>

Figure 3:
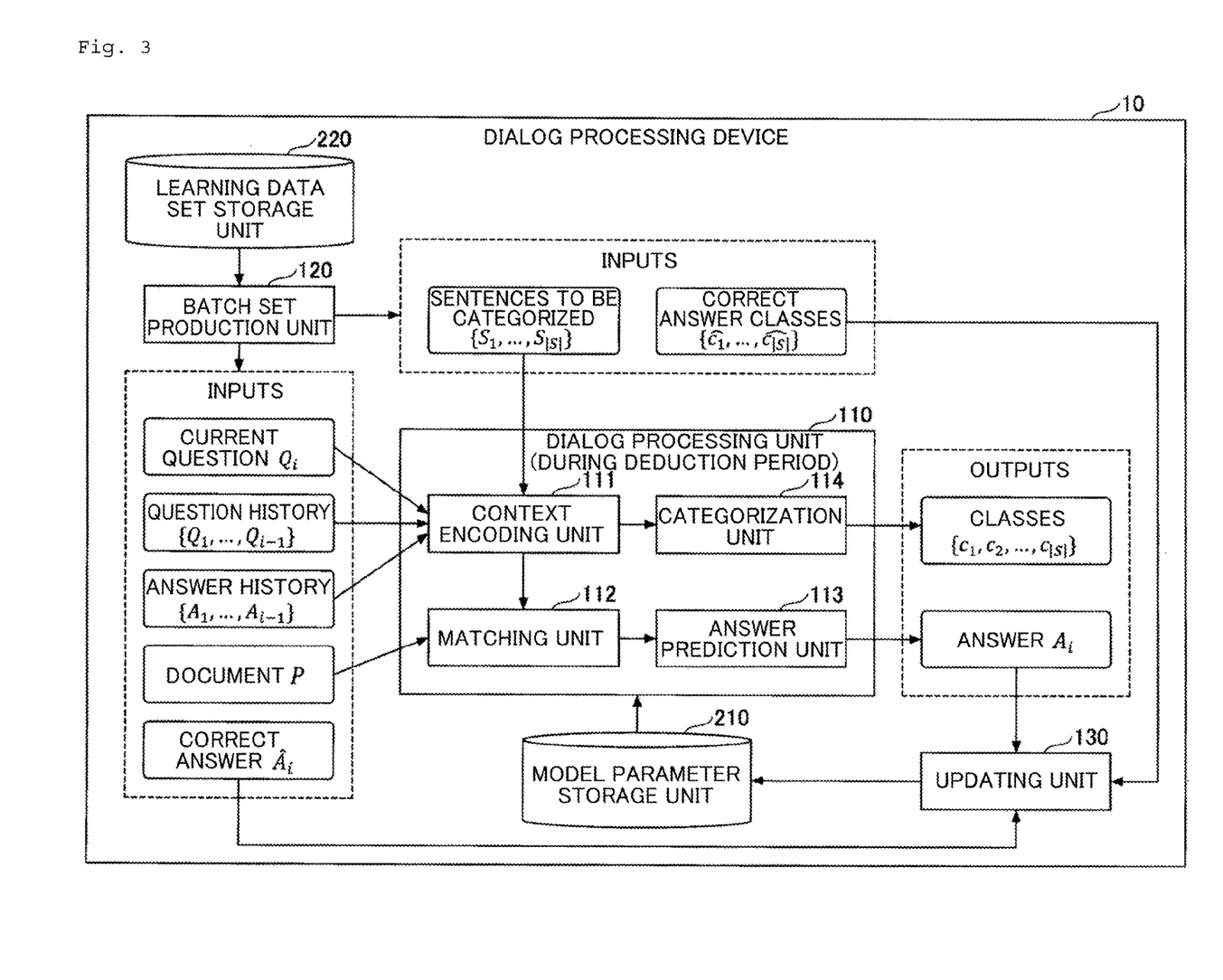
FIG. 3 is a diagram illustrating an example of an overall configuration of a dialogue processing apparatus in a second embodiment.

First, referring to FIG. 3, a description will be given of an overall configuration of the dialogue processing apparatus 10 in the second embodiment. FIG. 3 is a diagram illustrating an example of the overall configuration of the dialogue processing apparatus 10 in the second embodiment.

As illustrated in FIG. 3, the dialogue processing apparatus 10 in the second embodiment has the dialogue processing unit 110, a batch set production unit 120, an updating unit 130, the model parameter storage unit 210, and a learning data set storage unit 220.

The model parameter storage unit 210 stores unlearned model parameters. Note that the unlearned model parameters will be hereinafter referred to simply as "model parameters".

The learning data set storage unit 220 stores a learning data set to be used to learn the model parameters. In the second embodiment, as the learning data set, a learning data set including learning data items for the interactive machine reading comprehension task and a learning data set including learning data items for the class categorization task are used. These learning data sets are collected in advance, and stored in the learning data set storage unit 220.

As the learning data set for the interactive machine reading comprehension task, for example, a data set described in Reference Literature 4 shown below can be used.

Reference Literature 4: Eunsol Choi, He He, Mohit Iyyer, Mark Yatskar, Wentau Yih, Yejin Choi, Percy Liang, and Luke Zettlemoyer, "QuAC: Question Answering in Context", In EMNLP, ArXiv: 1808.07036, 2018.

Each of the learning data items included in the learning data set for the interactive machine reading comprehension task includes the current question Q, the question history $\{Q_1, \ldots, Q_{i-1}\}$, the answer history $\{A_1, \ldots, A_{i-1}\}$, the document P, and a correct answer given by the following expression.

$$\hat{A}_i \quad \text{[Math. 3]}$$

The correct answer to the current question $Q_i$ will be hereinafter denoted also as "$\hat{A}_i$". Note that, in the case of the interactive machine reading comprehension task in the extraction format, the correct answer $\hat{A}_i$ is represented by a pair of a starting position and an ending position of a range in the document P which serves as an answer. Meanwhile, in the case of the interactive machine reading comprehension task in the generation format, the correct answer $\hat{A}_i$ is represented by a word string.

In addition, as the learning data set for the class categorization task, a data set that allows an ability to categorize each of sentences in a given document based on an attribute and an importance degree of the sentence to be acquired is used. Accordingly, the learning data set for the class categorization task is required to be a data set of learning data items in each of which the label indicating the attribute and the importance degree is given to each of the sentences. In other words, each of the learning data items included in the learning data set for the class categorization task includes a sentence set $\{S_1, \ldots, S_{|S|}\}$ to be categorized and a correct answer class for each of the sentences, which is given by the following expression.

$$\{\hat{c}_1, \ldots, \hat{c}_{|S|}\} \quad \text{[Math. 4]}$$

The correct answer class for $S_j$ (j=1, ..., |S|) is hereinafter denoted also as "$\hat{c}_j$". Note that $S_j$ represents a sentence (word string), while |S| represents the number of the sentences included in the sentence set.

As the data set that allows the ability to categorize each of the given sentences based on the importance degree of the sentence to be acquired, a data set described in Reference Literature 3 mentioned above can be used. This data set is a data set of learning data items each including a pair of an original text and a summary, which is used for text summarization. Therefore, it is possible to give, to each of sentences in the original text, a binary label indicating whether or not the sentence is included in the summary. For example, when the sentence is included in the summary, it is possible to give, as the label, a label indicating a "HIGH" importance degree thereto and, when the sentence is not included in the summary, it is possible to give, as the label, a label indicating a "LOW" importance degree thereto.

By thus giving a binary label indicating an importance degree as described above to each of the sentences in the original text by using the data set described in Reference Literature 3 mentioned above, it is possible to obtain the data set that allows the ability to categorize each of the sentences based on the importance degree thereof to be acquired. In other words, it is possible to obtain the data set usable for the class categorization task of predicting whether or not each of the sentences in the original text is included in the summary (i.e., categorizing whether or not each of the sentences is included in the summary) by using the data set described in Reference Literature 3 mentioned above. As a result, by performing learning using such a data set, the model is allowed to estimate the importance degree of each of the sentences.

As the data set that allows the ability to categorize each of the given sentences based on the attribute of the sentence to be acquired, e.g., a data set described in Reference Literature 5 shown below can be used.

Reference Literature 5: Mihail Eric, Lakshmi Krishnan, Francois Charette, and Christopher D. Manning, "Key-Value Retrieval Networks for Task-Oriented Dialogue".

The data set described in Reference Literature 5 is a data set in which, to one dialogue between two speakers, a label indicating a topic/details of the dialogue is given. For example, to a dialogue (a total of about 3 turns) asking a location of a nearest gas station, a label "navigate" is given. In the data set described in Reference Literature 5 mentioned above, three types of labels "schedule", "navigate", and "weather" are used. Accordingly, when the data set is to be used, the label given to the dialogue is given to each of utterances in the dialogue to thereby give one of the three types of labels to a sentence representing each of the utterances and use the data set.

The batch set production unit 120 produces a training batch set from the learning data sets (the learning data set for the interactive machine reading comprehension task and the learning data set for the class categorization task) stored in the learning data set storage unit 220.

In other words, for example, the batch set production unit 120 divides the learning data set for the interactive machine reading comprehension task into batches to produce a batch set $B^d$ and divides the learning data set for the class categorization task into batches to produce a batch set $B^c$. Then, the batch set production unit 120 gives an identifier idx=1 to each of the batches included in the batch set $B^d$, while giving an identifier idx=0 to each of the batches included in the batch set $B^c$, combines these batches with each other to produce a batch set B, and then randomly shuffles an order of the individual batches included in the batch set B. Thus, the batch set B for learning the model parameters is produced. A batch is a set of a predetermined number of learning data items. As will be described later, the model parameters are updated on a per batch basis. While the learning data set may also be referred to as the "batch" and a set obtained by dividing the learning data set by a predetermined number of learning data items may also be referred to as a "mini batch", in the present description, a set obtained by dividing the learning data set by the predetermined number of learning data items is referred to as the "batch".

The dialogue processing unit 110 uses each of the learning data items in the batches included in the batch set B to generate and output an answer according to the interactive machine reading comprehension task or estimate and output a class according to the class categorization task. In other words, when the identifier of the batch is idx=1, the dialogue processing unit 110 receives, as inputs, the current question $Q_i$, the question history $\{Q_1, \ldots, Q_{i-1}\}$, the answer history $\{A_1, \ldots, A_{i-1}\}$, and the document P which are included in each of the learning data items in the batch (i.e., the learning data for the interactive machine reading comprehension task), and uses the model parameters to generate and output the answer $A_i$ to the current question $Q_i$. Meanwhile, when the identifier of the batch is idx=0, the dialogue processing unit 110 receives, as an input, the sentence set $\{S_1, \ldots, S_{|s|}\}$ included in the learning data items (i.e., the learning data for the class categorization task) in the batch, and estimates and outputs classes $\{c_1, c_2, \ldots, c_{|s|}\}$.

In the second embodiment, the dialogue processing unit 110 includes the context encoding unit 111, the matching unit 112, the answer prediction unit 113, and a categorization unit 114. Each of the units is implemented by a neural network. Model parameters to be used by the categorization unit 114 (i.e., parameters of the neural network implementing the categorization unit 114) will be hereinafter referred to as "fourth model parameters".

In the case of using the learning data for the interactive machine reading comprehension task, the context encoding unit 111, the matching unit 112, and the answer prediction unit 113 generates and outputs the answer $A_i$ by performing the same processing as performed in the first embodiment. However, instead of the learned model parameters, unlearned parameters (i.e., the unlearned first to third model parameters) are used.

Meanwhile, in the case using the learning data for the class categorization task, the context encoding unit 111 and the categorization unit 114 uses the unlearned model parameters (i.e., the unlearned first to fourth model parameters) to estimate and output the classes $\{c_1, c_2, \ldots, c_{|s|}\}$. In other words, when the context encoding unit 111 is implemented by, e.g., the BERT, a word string having the class token [CLS] added to the beginning thereof and obtained by connecting the individual sentences $S_1, \ldots, S_{|s|}$ with the separator tokens [SEP] is input to the BERT, and the encoded context vector u is generated and output. Then, the encoded context vector u is input to the categorization unit 114 implemented by a neural network including, e.g., one linear transformation layer, and a probability that each of the sentences belongs to each of the classes, which is given by the following expression, is obtained.

$$x \in \mathbb{R}^{C \times L_3} \qquad \text{[Math. 5]}$$

where C represents the number of the classes and $L_3$ represents the number of words obtained by adding up the total number of words in the sentence set $\{S_1, \ldots, S_{|s|}\}$ and the number of words of the special characters. At this time, when [SEP] that separates the individual sentences is used to represent each of the sentences, an x-vector (C-dimensional vector) corresponding to a position of [SEP] is used as a vector representing the probability that the sentence belongs to each of the classes. Thus, the probability that a sentence $S_j$ belongs to each of the classes is obtained, and a class $c_j$ to which the sentence $S_j$ belongs is estimated by the categorization unit 114.

The updating unit 130 uses an error between the answer $A_i$ generated and output by the answer prediction unit 113 and the correct answer $\hat{A}_i$, to update the model parameters (the first model parameters to the third model parameters) stored in the model parameter storage unit 210. The updating unit 130 also uses errors between the classes $\{c_1, c_2, \ldots, c_{|s|}\}$ estimated and output by the categorization unit 114 and correct answer classes $\{\hat{c}_1, \hat{c}_2, \ldots, \hat{c}_{|s|}\}$, to update the model parameters (the first model parameters and the fourth model parameters) stored in the model parameter storage unit 210.

Note that, during the learning period, the fourth model parameters also become learning targets (updating targets) but, during the deduction period, the fourth model parameters are not used. This is because, during the deduction period, the dialogue processing unit 110 does not include the categorization unit 114.

<Learning Processing>

Figure 4:
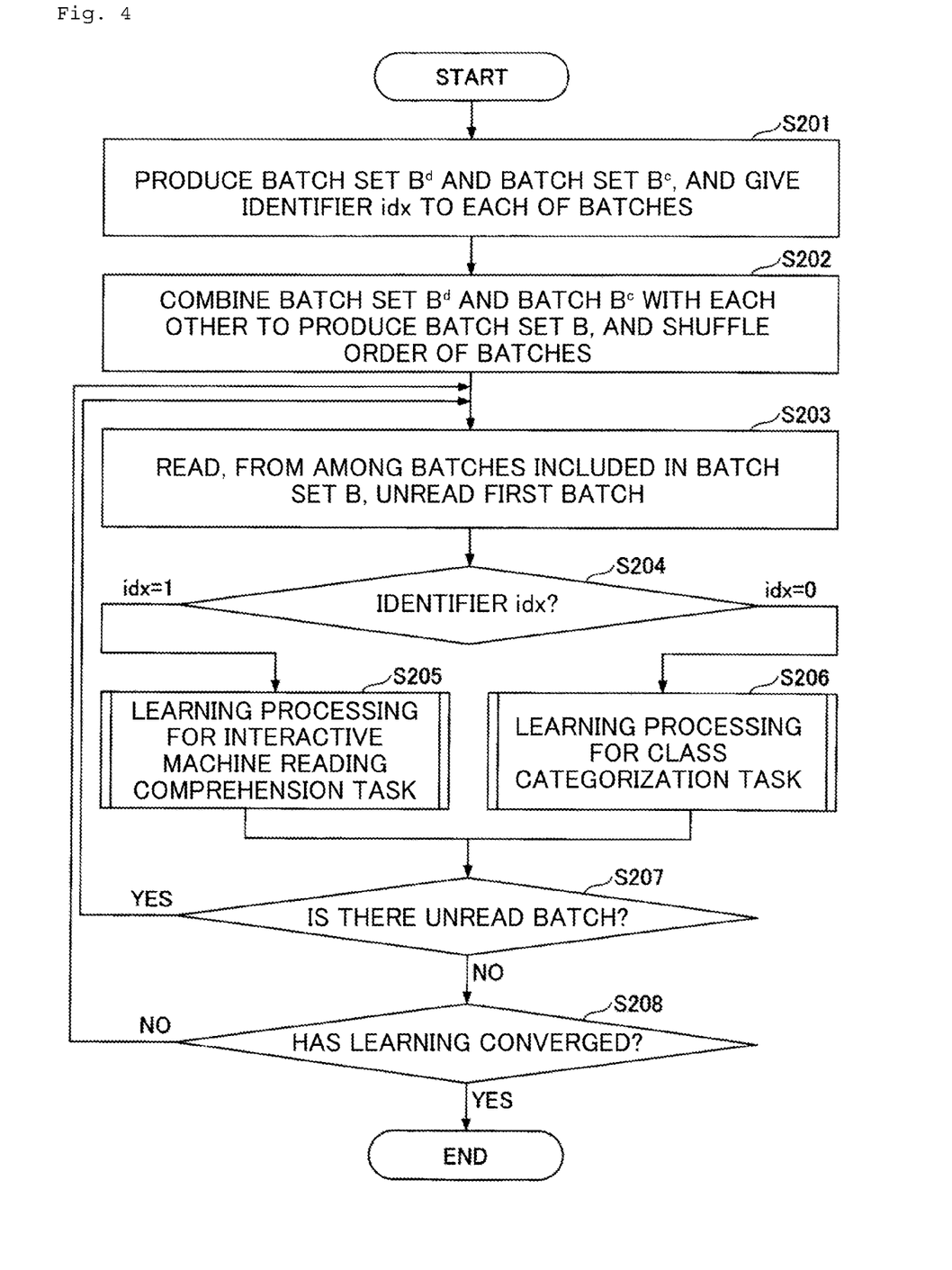
FIG. 4 is a flow chart illustrating an example of learning processing in the second embodiment.

Referring to FIG. 4, a description will be given of processing (learning processing) of learning the model parameters (the first model parameters to the fourth model parameters) by using the learning data. FIG. 4 is a flow chart illustrating an example of the learning processing in the second embodiment. It is assumed that the model parameters stored in the model parameter storage unit 210 have been initialized to appropriate values before the learning processing is started.

First, the batch set production unit 120 produces the batch set $B^d$ and the batch set $B^c$ from the learning data sets stored in the learning data set storage unit 220, gives the identifier idx=1 to each of the batches included in the batch set $B^d$, and gives the identifier idx=0 to each of the batches included in the batch set $B^c$ (Step S201).

In other words, the batch set production unit 120 divides the learning data set for the interactive machine reading comprehension task into the batches to produce the batch set $B^d$, and gives the identifier idx=1 to each of the batches included in the batch set $B^d$. Likewise, the batch set production unit 120 divides the learning data set for the class categorization task into the batches to produce the batch set $B^c$, and gives the identifier idx=0 to each of the batches included in the batch set $B^c$. Note that the identifier idx=1 represents that the batch of concern is a batch including the learning data items for the interactive machine reading comprehension task, while the identifier idx=0 represents that the batch of concern is a batch including the learning data items for the class categorization task.

Then, the batch set production unit 120 combines the batch set $B^d$ and the batch set $B^c$ with each other to produce the batch set B and randomly shuffles the order of the individual batches included in the batch set B (Step S202). As a result, the batch set B including the batches for the interactive machine reading comprehension task and the batches for the class categorization task in a random order is obtained.

The dialogue processing unit 110 reads, from among the batches included in the batch set B, the unread first batch (Step S203).

Then, the dialogue processing unit 110 determines whether the identifier given to the batch read in Step S203 described above is idx=1 or idx=0 (Step S204).

When it is determined in Step S204 described above that the identifier is idx=1, the dialogue processing apparatus 10 performs the learning processing for the interactive machine reading comprehension task (Step S205). In other words, the dialogue processing apparatus 10 uses the learning data for the machine reading comprehension task to learn the first to third model parameters. Note that details of the learning processing for the interactive machine reading comprehension task will be described later.

Meanwhile, when it is determined in Step S204 described above that the identifier is idx=0, the dialogue processing apparatus 10 performs the learning processing for the class categorization task (Step S206). In other words, the dialogue processing apparatus 10 uses the learning data for the class categorization task to learn the first model parameters and the fourth model parameters. Note that details of the learning processing for the class categorization task will be described later.

Subsequently to Step S205 or Step S206 described above, the dialogue processing unit 110 determines whether or not the batch set B includes an unread batch (Step S207).

When it is determined in Step S207 described above that there is an unread batch, the dialogue processing unit 110 returns to Step S203 described above. As a result, on each of the batches included in the batch set B, either Step S205 or Step S206 described above is performed depending on the identifier thereof.

Meanwhile, when it is not determined in Step S207 described above that there is an unread batch (i.e., when all the batches in the batch set B have already been read), the dialogue processing unit 110 determines whether or not the learning has converged (Step S208).

Then, when it is not determined in Step S208 described above that the learning has converged, the dialogue processing unit 110 assumes that all the batches in the batch set B are unread, and returns to Step S203 described above. As a result, using the batch set B, Steps S203 to S207 described above are performed again.

Meanwhile, when it is determined in Step S208 described above that the learning has converged, the dialogue processing unit 110 ends the learning processing. As a result, the learned model parameters are obtained. Note that examples of conditions for the convergence of the learning include a case where Steps S203 to S207 described above have repeatedly been performed a predetermined number of times and the like.

Thus, in the second embodiment, through multi-task learning of the interactive machine reading comprehension task and the class categorization task (i.e., the learning processing in Step S205 described above and the learning processing in Step S206 described above), the learned model parameters are obtained. Note that, as described above, among the learned first to fourth model parameters, only the learned first to third model parameters are used during the deduction period.

«Learning Processing for Interactive Machine Reading Comprehension Task»

Figure 5:
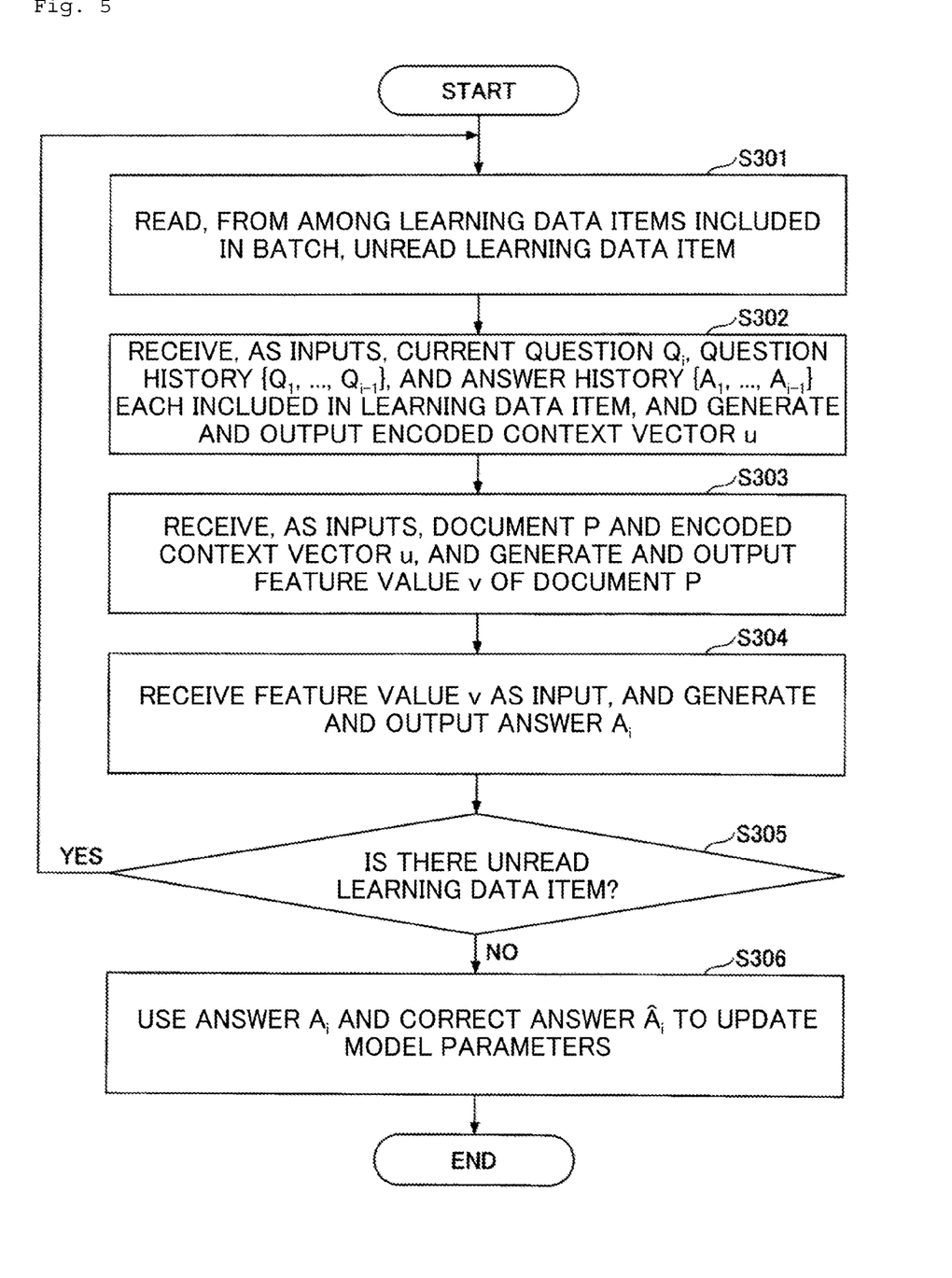
FIG. 5 is a flow chart illustrating an example of learning processing for an interactive machine reading comprehension task.

Next, referring to FIG. 5, a description will be given of details of the learning processing for the interactive machine reading comprehension task in Step S205 described above. FIG. 5 is a flow chart illustrating an example of the learning processing for the interactive machine reading comprehension task.

First, the dialogue processing unit 110 reads, from among the learning data items included in the batch (batch to which idx=1 is given) read in Step 203 described above, an unread learning data item (Step S301).

Then, the context encoding unit 111 of the dialogue processing unit 110 receives, as inputs, the current question $Q_i$, the question history $\{Q_1, \ldots, Q_{i-1}\}$, and the answer history $\{A_1, \ldots, A_{i-1}\}$ which are included in the learning data item read in Step S301 described above, and uses the first model parameters, to generate and output the encoded context vector u (Step S302).

Then, the matching unit 112 of the dialogue processing unit 110 receives, as inputs, the document P included in the learning data item read in Step S301 described above and the encoded context vector u output in Step S302 described above, and uses the second model parameters, to generate and output the feature value v (Step S303).

Then, the answer prediction unit 113 of the dialogue processing unit 110 receives, as an input, the feature value v output in Step S303 described above, and uses the third model parameters to generate and output the answer $A_i$ (Step S304).

Then, the dialogue processing unit 110 determines whether or not the batch includes an unread learning data item (Step S305).

When it is determined in Step S305 described above that there is an unread learning data item, the dialogue processing unit 110 returns to Step S301 described above. As a result, on each of the learning data items included in the batch, Steps S301 to S304 described above are performed.

Meanwhile, when it is not determined in Step S305 described above that there is an unread learning data item, the updating unit 130 uses the error between each of the answers $A_i$ output in Step S304 described above and the correct answer $\hat{A}_i$ corresponding to each of the answers $A_i$ to update the first to third model parameters stored in the model parameter storage unit 210 (Step S306). Note that the updating unit 130 may appropriately update the first to third model parameters by using a known optimization method used for the learning of the interactive machine reading comprehension task.

《Learning Processing for Class Categorization Task》

Figure 6:
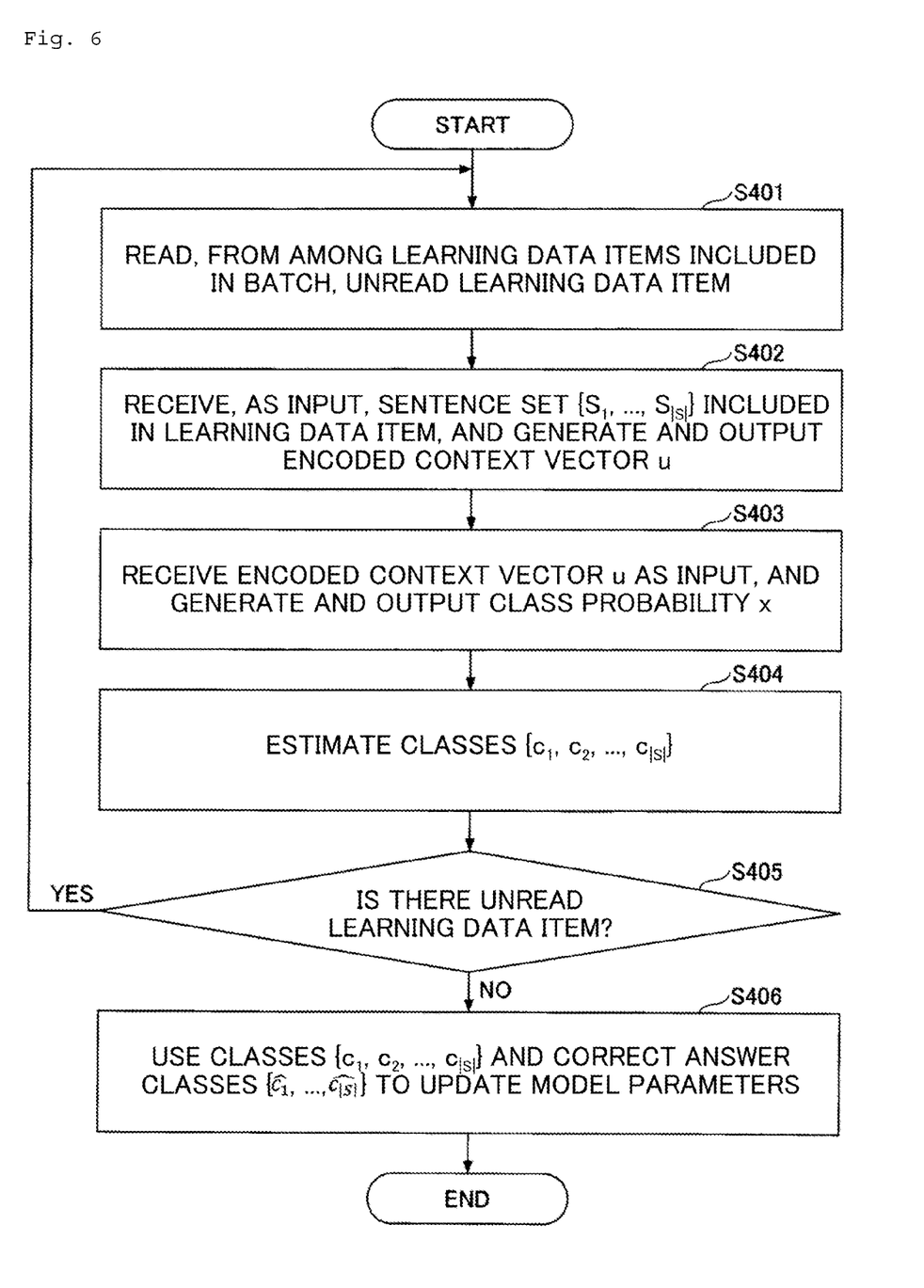
FIG. 6 is a flow chart illustrating an example of learning processing for a class categorization task.

Next, referring to FIG. 6, a description will be given of the details of the learning processing for the class categorization task in Step S206 described above. FIG. 6 is a flow chart illustrating an example of the learning processing for the class categorization task.

First, the dialogue processing unit 110 reads, from among the learning data items included in the batch (batch to which idx=0 is given) read in Step 203 described above, an unread learning data item (Step S401).

Then, the context encoding unit 111 of the dialogue processing unit 110 receives, as an input, the sentence set $\{S_1, \ldots, S_{|S|}\}$ included in the learning data item read in Step S401 described above, and uses the first model parameters to generate and output the encoded context vector u (Step S402).

Then, the categorization unit 114 of the dialogue processing unit 110 receives, as an input, the encoded context vector u output in Step S402 described above, and uses the second model parameters, to generate and output a probability x that each of the sentences belongs to each of the classes (Step S403).

Then, the categorization unit 114 of the dialogue processing unit 110 estimates, from the probability x output in Step S403 described above, the classes $\{c_1, c_2, \ldots, c_{|S|}\}$ to which the individual sentences $S_1, \ldots, S_{|S|}$ belong (Step S404).

Then, the dialogue processing unit 110 determines whether or not the batch includes an unread learning data item (Step S405).

When it is determined in Step S405 described above that there is an unread learning data item, the dialogue processing unit 110 returns to Step S401 described above. As a result, on each of the learning data items included in the batch, Steps S401 to S404 described above are performed.

Meanwhile, when it is not determined in Step S405 described above that there is an unread learning data item, the updating unit 130 uses the errors between $\{c_1, c_2, \ldots, c_{|S|}\}$ output in Step S403 described above and the correct answer classes $\{\hat{c}_1, \hat{c}_2, \ldots, \hat{c}_{|S|}\}$ to update the first model parameters and the fourth model parameters which are stored in the model parameter storage unit 210 (Step S406). Note that the updating unit 130 may appropriately update the first model parameters and the fourth model parameters by using a known optimization method used for the learning of the class categorization task.

<Hardware Configuration>

Figure 7:
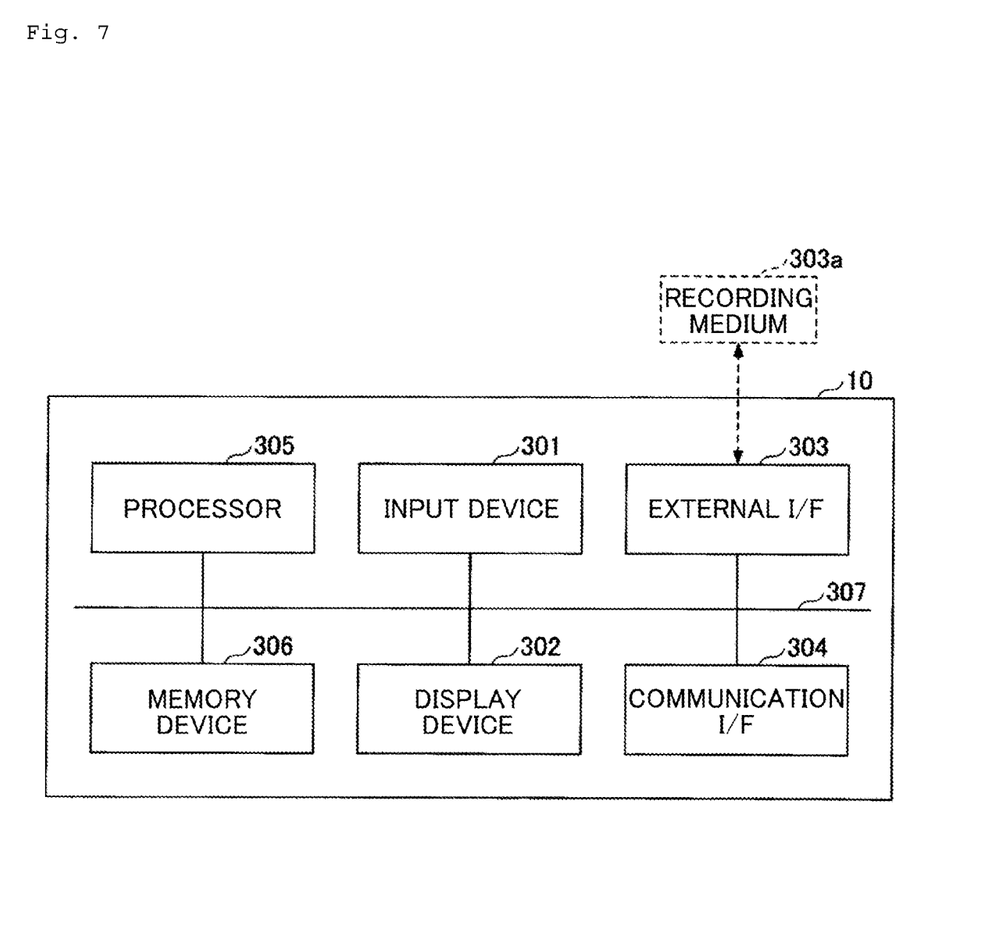
FIG. 7 is a diagram illustrating an example of a hardware configuration of a dialogue processing apparatus according to an embodiment.

Finally, a description will be given of a hardware configuration of the dialogue processing apparatus 10 according to the present embodiment with reference to FIG. 7. FIG. 7 is a diagram illustrating an example of the hardware configuration of the dialogue processing apparatus according to an embodiment.

As illustrated in FIG. 7, the dialogue processing apparatus 10 according to the present embodiment is implemented by a typical computer or computer system and has an input device 301, a display device 302, an external I/F 303, a communication I/F 304, a processor 305, and a memory device 306. These hardware items are communicatively connected to each other via a bus 307.

Examples of the input device 301 include a keyboard, a mouse, a touch panel, and the like. Examples of the display device 302 include a display and the like. Note that the dialogue processing apparatus 10 need not necessarily have at least one of the input device 301 and the display device 302.

The external I/F 303 is an interface with an external apparatus. Examples of the external apparatus include a recording medium 303a and the like. The dialogue processing apparatus 10 can perform reading, writing, and the like from/to the recording medium 303a via the external I/F 303. In the recording medium 303a, one or more programs which implement the individual functional units (the dialogue processing unit 110, the batch set production unit 120, and the updating unit 130) included in the dialogue processing apparatus 10 may also be stored.

Examples of the recording medium 303a include a CD (Compact Disc), a DVD (Digital Versatile Disk), a SD memory card (Secure Digital memory card), a USB (Universal Serial Bus) memory card, and the like.

The communication I/F 304 is an interface for connecting the dialogue processing apparatus 10 to a communication network. Note that the one or more programs which implement the individual functional units included in the dialogue processing apparatus 10 may also be acquired (downloaded) from a given server apparatus or the like via the communication I/F 304.

Examples of the processor 305 include various arithmetic devices such as a CPU (Central Processing Unit) and a GPU (Graphics Processing Unit). The individual processing units included in the dialogue processing apparatus 10 are implemented by processing of, e.g., causing the processor 305 to execute one or more programs stored in the memory device 306.

Examples of the memory device 306 include various storage devices such as an HDD (Hard Disk Drive), an SSD (Solid State Drive), a RAM (Random Access Memory), a ROM (Read Only Memory), and a flash memory. Each of the storage units (the model parameter storage unit 201 and the learning data set storage unit 220) of the dialogue processing apparatus 10 can be implemented by using, e.g., the memory device 306. Note that at least one of these storage units may also be implemented by using a storage device (such as, e.g., a database server) connected to the dialogue processing apparatus 10 via the communication network.

The dialogue processing apparatus 10 according to the present embodiment has the hardware configuration illustrated in FIG. 7 and can thereby implement the dialogue processing and the learning processing each described above. Note that the hardware configuration illustrated in FIG. 7 is exemplary, and the dialogue processing apparatus 10 may also have another hardware configuration. For example, the dialogue processing apparatus 10 may also include a plurality of the processors 305 or may also include a plurality of the memory devices 306.

The present invention is not limited to the specifically disclosed embodiments described above, and can variously be modified, changed, and combined with an existing technology without departing from the scope of claims.

REFERENCE SIGNS LIST

Dialogue processing apparatus
110 Dialogue processing unit
111 Context encoding unit
112 Matching unit
113 Answer prediction unit
114 Categorization unit
120 Batch set production unit
130 Updating unit
210 Model parameter storage unit
220 Learning data set storage unit

The invention claimed is:

1. A learning apparatus comprising:
one or more computers each including a memory and a processor configured to:
receive, as an input, a first input word string obtained by connecting a question $Q_i$ as a word string representing a current question in an interactive machine reading comprehension task, a question history $\{Q_1, \ldots, Q_{i-1}\}$ as a set of word strings representing previous questions in the interactive machine reading comprehension task, and an answer history $\{A_1, \ldots, A_{i-1}\}$ as a set of word strings representing previous answers to the previous questions in the interactive machine reading comprehension task or a second input word string obtained by connecting word strings representing individual sentences to be categorized in a class categorization task, and use a first model parameter, to generate an encoded context vector u of a context represented by the first input word string or the second input word string;
receive, as inputs, a document P to be used to generate an answer $A_i$ to the question $Q_i$ and the encoded context vector u generated from the first input word string, and use a second model parameter, to perform matching between the document P and the previous questions and previous answers included in the first input word string, to generate the answer $A_i$ to the question $Q_i$;
receive, as an input, the encoded context vector u generated from the second input word string, and use a third model parameter, to estimate a class to which each of the sentences belongs;
use an error between the answer $A_i$ and a correct answer to the question $Q_i$, to perform first updating to update the first model parameter and the second model parameter; and
use an error between the class and a correct answer class to which each of the sentences to be categorized belongs, to perform second updating to update the first model parameter and the third model parameter.

2. The learning apparatus according to claim 1, wherein the memory and the processor are further configured to use a first learning data set including learning data items each including any of the sentences to be categorized and the correct answer class to which the sentence belongs, to estimate the class and perform the second updating, and
each of the sentences to be categorized and the correct answer class correspond to each of sentences included in an original text and an importance degree indicating whether the sentence is included in a summary, and are produced from a data set including the original text and the summary or/and correspond to each of sentences included in a dialogue including the one or more sentences and an attribute indicating a topic in the dialogue or details of the dialogue, and are produced from a data set including the dialogue and a label indicating the topic therein or the details thereof.

3. The learning apparatus according to claim 2, wherein the memory and the processor are further configured to:
divide each of the first learning data set and a second learning data set to be used to learn the interactive machine reading comprehension task into a plurality of batches to produce a batch set including the plurality of batches;
determine, for each of the batches included in the batch set, whether the batch is a batch resulting from the division of the first learning data set or a batch resulting from the division of the second learning data set;
when the batch is determined to be the batch resulting from the division of the first learning data set, receive a second input word string obtained by connecting word strings representing individual sentences included in the learning data items included in the batch as an input, and generate the encoded context vector u; and
when the batch is determined to be the batch resulting from the division of the second learning data set, receive a first input word string obtained by connecting the question $Q_i$, the question history $\{Q_1, \ldots, Q_{i-1}\}$, and the answer history $\{A_1, \ldots, A_{i-1}\}$ which are included in each of the learning data items included in the batch as an input, and generate the encoded context vector u.

4. A learning method executed by a computer, the method comprising:
receiving, as an input, a first input word string obtained by connecting a question $Q_i$ as a word string representing a current question in an interactive machine reading comprehension task, a question history $\{Q_1, \ldots, Q_{i-1}\}$ as a set of word strings representing previous questions in the interactive machine reading comprehension task, and an answer history $\{A_1, \ldots, A_{i-1}\}$ as a set of word strings representing previous answers to the previous questions in the interactive machine reading comprehension task or a second input word string obtained by connecting word strings representing individual sentences to be categorized in a class categorization task, and using a first model parameter, to generate an encoded context vector u of a context represented by the first input word string or the second input word string;
receiving, as inputs, a document P to be used to generate an answer $A_i$ to the question $Q_i$ and the encoded context vector u generated from the first input word string, and using a second model parameter, to perform matching between the document P and the previous questions and previous answers included in the first input word string, to generate the answer $A_i$ to the question $Q_i$;
receiving, as an input, the encoded context vector u generated from the second input word string, and using a third model parameter, to estimate a class to which each of the sentences belongs;
using an error between the answer $A_i$ and a correct answer to the question $Q_i$, to update the first model parameter and the second model parameter; and
using an error between the class and a correct answer class to which each of the sentences to be categorized belongs, to update the first model parameter and the third model parameter.

* * * * *